United States Patent
Fang et al.

(10) Patent No.: US 10,164,995 B1
(45) Date of Patent: Dec. 25, 2018

(54) DETERMINING MALWARE INFECTION RISK

(71) Applicant: Pivotal Software, Inc., Palo Alto, CA (US)

(72) Inventors: Chunsheng Fang, Redwood City, CA (US); Derek Chin-Teh Lin, San Mateo, CA (US)

(73) Assignee: Pivotal Software, Inc., San Francisco, CA (US)

( * ) Notice: Subject to any disclaimer, the term of this patent is extended or adjusted under 35 U.S.C. 154(b) by 369 days.

(21) Appl. No.: 14/826,867

(22) Filed: Aug. 14, 2015

Related U.S. Application Data

(60) Provisional application No. 62/037,540, filed on Aug. 14, 2014, provisional application No. 62/194,680, filed on Jul. 20, 2015.

(51) Int. Cl.
| | |
|---|---|
| *G06F 11/00* | (2006.01) |
| *H04L 29/06* | (2006.01) |
| *G06F 17/30* | (2006.01) |
| *G06F 21/57* | (2013.01) |

(52) U.S. Cl.
CPC .... *H04L 63/1433* (2013.01); *G06F 17/30958* (2013.01); *G06F 21/577* (2013.01)

(58) Field of Classification Search
CPC ............. H04L 63/1425; H04L 63/1416; H04L 63/1433; H04L 63/1441; H04L 63/1408
USPC .......................................................... 726/25
See application file for complete search history.

(56) References Cited

U.S. PATENT DOCUMENTS

| | | | | |
|---|---|---|---|---|
| 6,609,205 | B1 * | 8/2003 | Bernhard | H04L 63/1425 726/22 |
| 7,409,721 | B2 * | 8/2008 | Hernacki | H04L 63/14 709/223 |
| 8,341,745 | B1 | 12/2012 | Chau et al. | |
| 8,578,497 | B2 * | 11/2013 | Antonakakis | G06F 21/577 709/224 |
| 8,813,236 | B1 * | 8/2014 | Saha | H04L 63/1408 726/22 |
| 9,191,403 | B2 * | 11/2015 | Zoldi | H04L 63/1433 |
| 9,195,826 | B1 * | 11/2015 | Fang | G06F 21/56 |
| 9,516,053 | B1 * | 12/2016 | Muddu | H04L 63/1425 |
| 9,531,738 | B2 * | 12/2016 | Zoldi | H04L 63/1433 |
| 9,838,410 | B2 * | 12/2017 | Muddu | H04L 63/1425 |
| 2015/0195299 | A1 * | 7/2015 | Zoldi | H04L 63/1433 726/25 |

(Continued)

OTHER PUBLICATIONS

Yadav et al., "Detecting Algorithmically Generated Malicious Domain Names," IMC'10, Nov. 1-3, 2010, pp. 48-61.

*Primary Examiner* — Samson B Lemma
(74) *Attorney, Agent, or Firm* — Fish & Richardson P.C.

(57) ABSTRACT

Methods, systems, and apparatus, including computer programs encoded on computer storage media, for performing semi-supervised learning on partially labeled nodes on a bipartite graph. One described method can determine a useful score of malware infection risk from partial known facts for entities modeled as nodes on a bipartite graph, where network traffic is measured between inside-the-enterprise entities and outside-the-enterprise entities. This and other methods can be implemented in a large-scale massively parallel processing database. Methods of scaling the partial label input and of presenting the results are also described.

28 Claims, 4 Drawing Sheets

(56) References Cited

U.S. PATENT DOCUMENTS

| | | | | |
|---|---|---|---|---|
| 2015/0278729 A1* | 10/2015 | Hu | ................... | G06Q 10/0635 705/7.28 |
| 2016/0014147 A1* | 1/2016 | Zoldi | ................. | H04L 63/1433 726/23 |
| 2016/0057159 A1* | 2/2016 | Yin | ...................... | H04L 63/145 726/23 |

* cited by examiner

DETERMINING MALWARE INFECTION RISK

CROSS-REFERENCE TO RELATED APPLICATIONS

This application claims the benefit under 35 U.S.C. § 119(e) of the filing date of U.S. Patent Application Ser. No. 62/037,540, filed Aug. 14, 2014, entitled "Determining Malware Infection Risk"; and of U.S. Patent Application Ser. No. 62/194,680, filed Jul. 20, 2015, entitled "Determining Malware Infection Risk". The entire contents of the foregoing applications are hereby incorporated by reference.

BACKGROUND

This specification relates to computer system security.

Many kinds of malicious computer software ("malware") are used to compromise personal and business computers, computer networks, and computer-based devices, e.g., smartphones.

Advanced forms of malware infection are hard to identify with existing state-of-the-art signature based solutions. Supervised learning based techniques face challenges in getting comprehensive sets of ground truth infected samples, e.g., website reputation listings or detected files containing malware, for training predictive models. It is becoming increasingly important to be able to automatically identify zero-day malware attacks, including attacks based on IP fast flux, algorithmically generated domain names, and polymorphic malware.

SUMMARY

This specification describes innovative techniques, including ones using semi-supervised learning, that can determine a useful score of malware infection risk from partial known facts. The semi-supervised learning of a scoring model can be performed on partially labeled nodes on a bipartite graph representing the underlying data. One described method can determine a useful score of malware infection risk from partial known facts for entities modeled as nodes on a bipartite graph, where network traffic is measured between inside-the-enterprise entities and outside-the-enterprise entities. The techniques can be realized in a large-scale data processing implementation that can determine malware infection risk scores in seconds of computing time for hundreds of thousands of end points in an enterprise network.

Methods, systems, and apparatus, including computer programs encoded on computer storage media, for performing this and other methods can be implemented in a large-scale massively parallel processing database.

The subject matter described in this specification can be implemented in particular embodiments so as to realize one or more of the following advantages. Computers and web sites that are likely infected with zero-day exploits can be identified. Computers and web sites that are likely infected with malware can be identified without use of signatures or other prior information characterizing the malware. Risk scoring can be done quickly in parallel. Unlike supervised learning methods that require full labeling of past infection records, the semi-supervised learning described in this specification maximizes informational values from incomplete or partial labeling.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
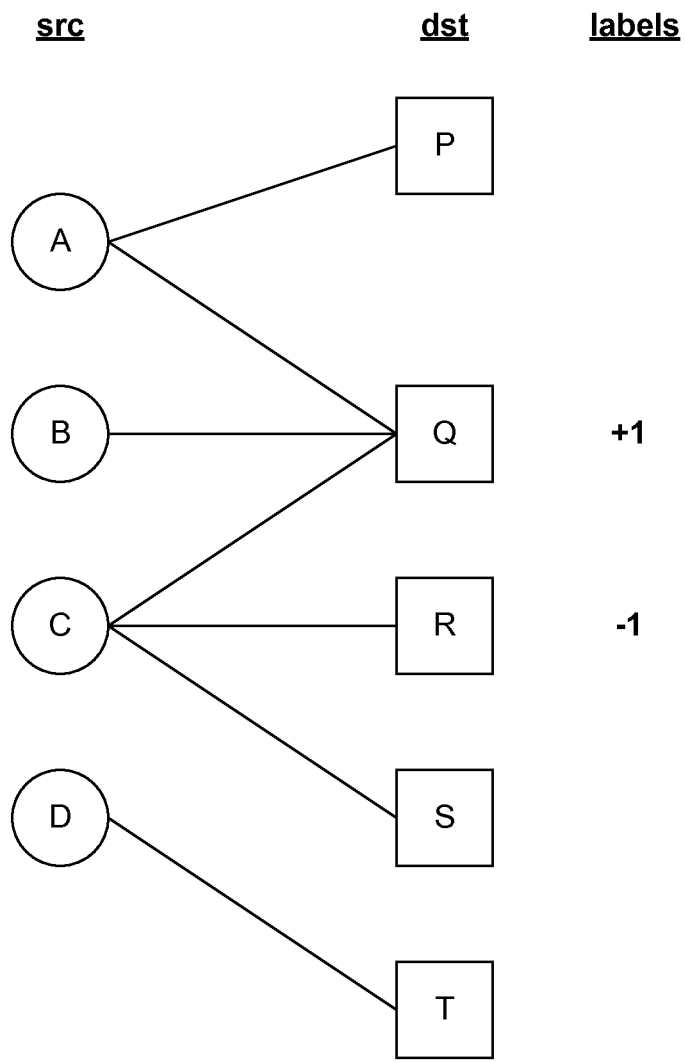
FIG. 1 illustrates an example bipartite graph with partial ground truth labels.

FIG. 1 illustrates an example bipartite graph with partial ground truth labels. The source nodes (labeled "src") are shown on the left side of the graph; the destination nodes (labeled "dst"), on the right side of the graph; and each ground truth label, either +1 or −1, is shown to the right of the destination node to which the label applies. The ground truth labels are referred to as "partial" because not all the nodes are labeled. Although the figure shows labels only for destination nodes, labels may exist for both source and destination nodes, or only for source nodes.

The data on which the graph and the malware risk analysis is based is data representing local to remote (L2R) network communication traffic, which can be collected, for example, from the perimeter of a network of interest, e.g., from enterprise network perimeter components, for example, firewalls, proxy servers, and so on. The traffic data can be collected from transaction logs of network traffic. The source nodes represent communicating network entities that are within the perimeter, e.g., user computers and hosts belonging to an enterprise or operating within an enterprise. The destination nodes represent communicating network entities that are outside the perimeter, e.g., Internet web sites. These are referred to as sources and destinations because generally an enterprise will allow a connection with an external entity to be initiated from within the enterprise perimeter, which is then naturally referred to as the source of the communication. In common scenarios, as many as 99% of the entities, or even more, will not have a label.

Figure 2:
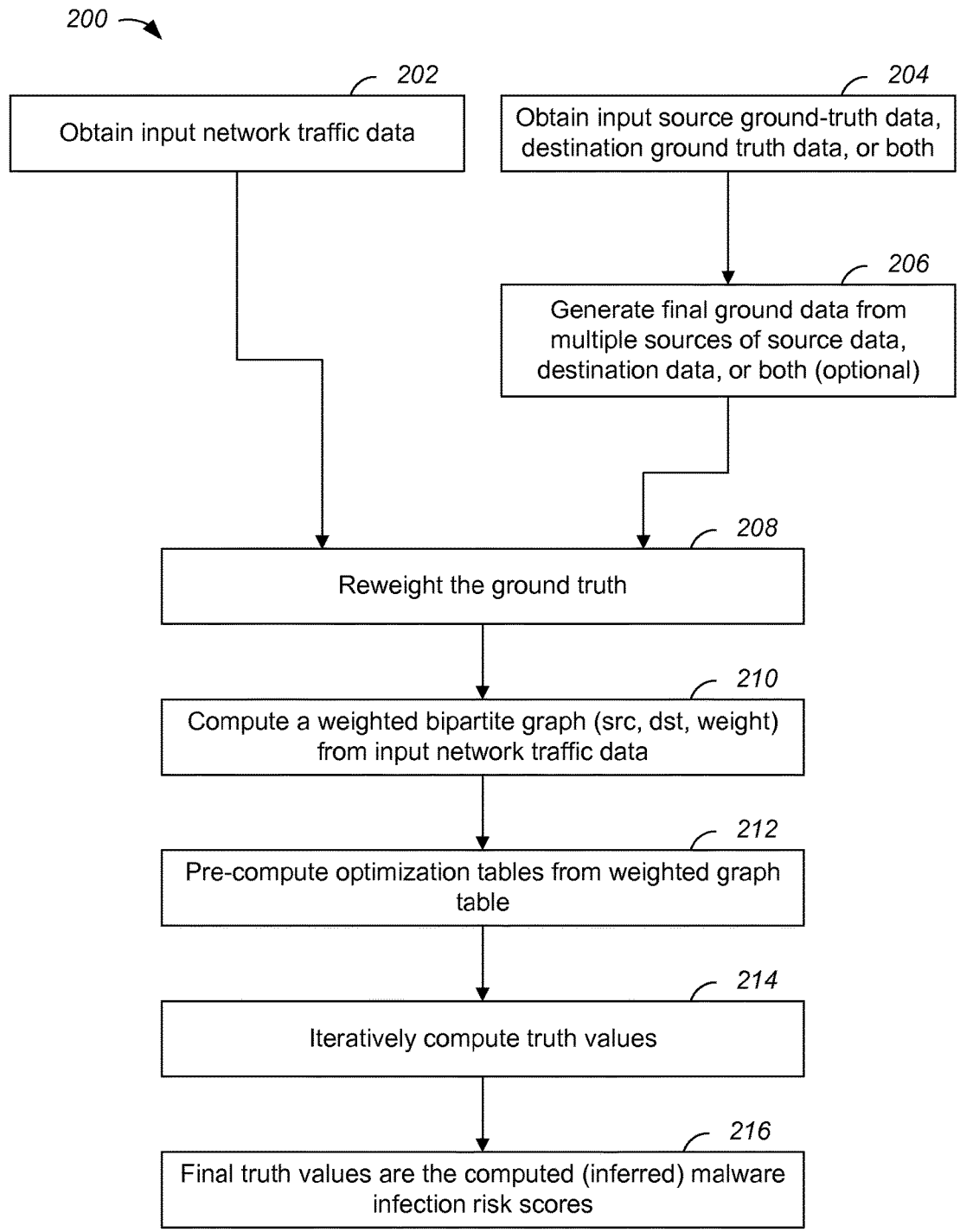
FIG. 2 is a flow chart of an example method for determining malware infection risk scores.

FIG. 2 is a flow chart of an example method 200 for determining malware infection risk scores. An example implementation of the method 200 will now be described. For convenience, the method will be described as being performed by a system of one or more computers, located in one or more locations, and programmed appropriately in accordance with this specification.

The input includes traffic data (202) and ground truth data (204). In common scenarios, the traffic data is collected by an enterprise and may include more information than is described below. The ground truth data may include data collected by the enterprise, data obtained from third parties, or both. An enterprise may collect data identifying enterprise entities that have been infected by malware. Such data may come from antivirus software or other software security tools. An enterprise may also develop data identifying external Internet sites as malicious or risky. Such information may also be obtained from one or more third parties that offer the service of identifying malicious sites.

The traffic data can be stored in any convenient way. In some implementations it is stored in a table, e.g., one having a structure network traffic data (src, dst, timestamp, fields). The use of fields data is optional. Examples of fields include user agent string or byte size of traffic. In the following example, this table will be denoted as D.

The truth data for destinations can be stored in any convenient way. In some implementations it is stored in a table, e.g., one having a structure truth dst (dst, score). Similarly, ground truth data for sources can be stored in another table, truth src (src, score). The input truth data are labels for entities that are known to be good or bad. There may be ground truth data for both sources and destinations, or for only one of them. In the implementation being described, the labels are +1, for a known good entities, and −1, for known bad entities. The value is 0 for unlabeled entities. The values associated with the unlabeled entities represented in the bipartite graph will become risk scores in the range −1 to +1 as a result of the computations described below. The computations described will also generate scores in that range for labeled entities. More generally, values other than −1 and +1 could be used, and the values, which may be denoted −r and +r, need not be integers.

In a plain text format, the ground truth input data can be pairs of URLs (Uniform Resource Locators) or IP (Internet Protocol) addresses and labels, e.g., the pairs ("badwebsite-.com", "−1") and ("goodwebsite.com", "+1"). Other ways of representing network entities can also be used. The labels are, or can be reduced to, numerical values. In the tables, or however the data is stored, the sources and destinations can be represented by unique identifiers, e.g., unique numbers, to which the URLs or other entity identifiers are mapped.

The ground truth data can optionally come from more than one ground truth source and can be generated as the weighted combination of the values from the ground truth sources (206). For example, if two URL reputation listings are available, with listing A having high credibility and listing B being less well known, the listings can be combined with a weighting, e.g., 80%×A+20%×B, to yield a final ground truth listing. More than two ground truth sources can be combined in this way to yield a final ground truth listing.

The output of the method 200 includes risk scores for sources, destinations, or both.

The risk scores as they are computed can be stored in tables, for example, in tables result_dst(dst, score), denoted in this example as $y_T$, and result_src(src, score), denoted in this example as $x_T$.

In this description, the ground truth for destinations will be represented by a vector $y_0$, where $y_0(i)$ is the label for destination i. Similarly, the ground truth for sources will be represented by a vector $x_0$.

The system can receive multiple ground truth sources and combine them into final ground truth vectors $y_0$ and $x_0$, as described above (206). The system can receive user input specifying the weighting factors by which the multiple sources are to be combined.

In order to balance the inference introduced by both positive and negative partially known ground-truth, the system reweights the ground truth vector $y_0$, using the following updating rule (208).

$$y_0(j) = \begin{cases} \frac{y_0(j)}{A}, \text{ where } A = \sum_i I(y_0(i) = +1), & \text{if } y_0(j) = +1 \\ \frac{y_0(j)}{B}, \text{ where } B = \sum_i I(y_0(i) = -1), & \text{if } y_0(j) = -1 \end{cases} \quad (1)$$

The system reweights ground truth vector $x_0$ in the same way (208).

In the foregoing rule, the function I( ) is an identity function whose value is 1 when its argument, the input equation, is true and zero otherwise.

The system computes a weighted bipartite graph (210) from the original input L2R network traffic table D(src,dst, time,fields), by means of an aggregate function. This weighted graph will be represented by W, where W(src,dst) is the weight according to the following expression.

$$W(src,dst) = \text{Aggregate}(D(src,dst,\text{time},\text{fields})\text{ON}(\text{time},\text{fields}))$$

The aggregate function Aggregate ( ) can be any of a number of aggregate functions. For example, the aggregate function can count the number of connections made between the src and dst entities within a time frame, or compute a sum of the bytes transferred between the src and dst entities, and so on. The use of fields in the aggregation is optional.

In some implementations, the system pre-computes tables U and V (212) from the graph according to the following expressions, in which N(p) denotes the set of all vertices in the bipartite graph sharing an edge with vertex p.

$$U(i,j) = \frac{W(i,j)}{\sum_{k \in N(i)} W(i,k)} \quad (2)$$

$$V(j,i) = \frac{W(i,j)}{\sum_{k \in N(j)} W(k,j)} \quad (3)$$

This is done to optimize performance in the following iterations.

The system performs an iterative inference process that iteratively computes scores from the ground truth values, implicitly stepping an iteration counter t from an initial value 1 until a termination condition occurs; for clarity, the final value will be denoted with the subscript T. The iteration proceeds according to the following expressions.

$$x_{t+1}(i) = \text{alpha} \times (\Sigma_{j \in N(i)} V(j,i) \times y_t(j)) + x_0(i) \quad (4)$$

$$y_{t+1}(j) = \text{beta} \times (\Sigma_{i \in N(j)} U(i,j) \times x_t(i)) + y_0(j) \quad (5)$$

In other implementations, to facilitate the scalability of the inference algorithm, the following simplification is used.

For such other implementations, a final unweighted bipartite graph G(src,dst) is constructed (210). This can be done in multiple ways, including those of the following two examples:

Example 1: G(src,dst)=EXIST(D(src,dst)). This bipartite graph simply represents the connection history from src to dst, if exists. That is, G has an edge from s to d if a connection from s to d exists in the underlying traffic history data, and not otherwise.

Example 2: G(src,dst)=SUM(D(src,dst,time,fields)ON (time,fields))>Threshold. This unweighted bipartite graph has an edge only when the historical communication bytes size exceeds a top percentile threshold Threshold, e.g., 50%, over the entire traffic history.

The system pre-computes optimization tables U and V (212) from the unweighted bipartite graph G, according to the following expressions, in which N(p) denotes the set of all vertices in the bipartite graph sharing an edge with vertex p and |N(p)| denotes the number of elements in the set.

$$U(i) = 1/|N(i)| \quad (6)$$

$$V(j)=1/|N(j)| \quad (7)$$

The system then performs the iterative inference process described above in reference to equations (4) and (5), using U(i) in place of U(i,j), and V(j) in place of V(j,i).

The constants alpha and beta are propagation weights. In some implementations, both have a value of 1. Their relative values, if different, indicate which source of ground truth is more trusted, the internal (src) or the external (dst) ground truth. The higher value indicates the greater degree of trust.

The scores in the vectors x and y define a trust ranking of the sources and destinations, respectively. That is, for example, if x(v) is less than x(w), then the entity represented by node v is ranked as being less trustworthy than the one represented by node w.

The subscripts of x and y are provided in the foregoing expressions to make the iteration easy to understand. It is not necessary that there be more than two instances of the vectors in addition to the vectors $y_0$ and $x_0$ containing the ground truth labels.

The iteration can be implemented with one or more termination conditions. For example, the system can terminate the iterations when the rankings defined by x and y of the network entities do not change, or when the absolute or relative sizes of the individual changes in x and y are less than a predetermined threshold value, or when the absolute or relative sizes of the aggregate of changes in x and y are less than a predetermined threshold value. To ensure termination, the system can also terminate when a predetermined maximum number of iterations has been reached.

When the iteration terminates, the system outputs the inferred, i.e., computed, risk score results: $x_T$(src), $y_T$(dst) (216).

The score results can be interpreted and presented in a number of ways. For example, the risk score results of destinations or sources can be ordered by the "negativeness", i.e., "maliciousness", or the "positiveness", i.e., "credibility" of the destinations or sources. In addition, the scores and other data can be visualized, for example, in a scatter plot. In particular, results can be presented as a scatter plot of source versus destination, with the aggregated amount of traffic between each source-destination pair represented by size of dots, or other numeric scores summarized from the features of the connections or traffic between them.

One useful form of output lists all the scored destinations in score order, showing the destination URL, the score, and whether or not the destination had a label in the input ground truth data.

The identification of previously-unknown malicious sources and destinations, i.e., ones with low $x_T$(src) or $y_T$(dst) scores, allows the system to identify previously-unknown sources and destinations of highly malicious network traffic.

Figure 3:
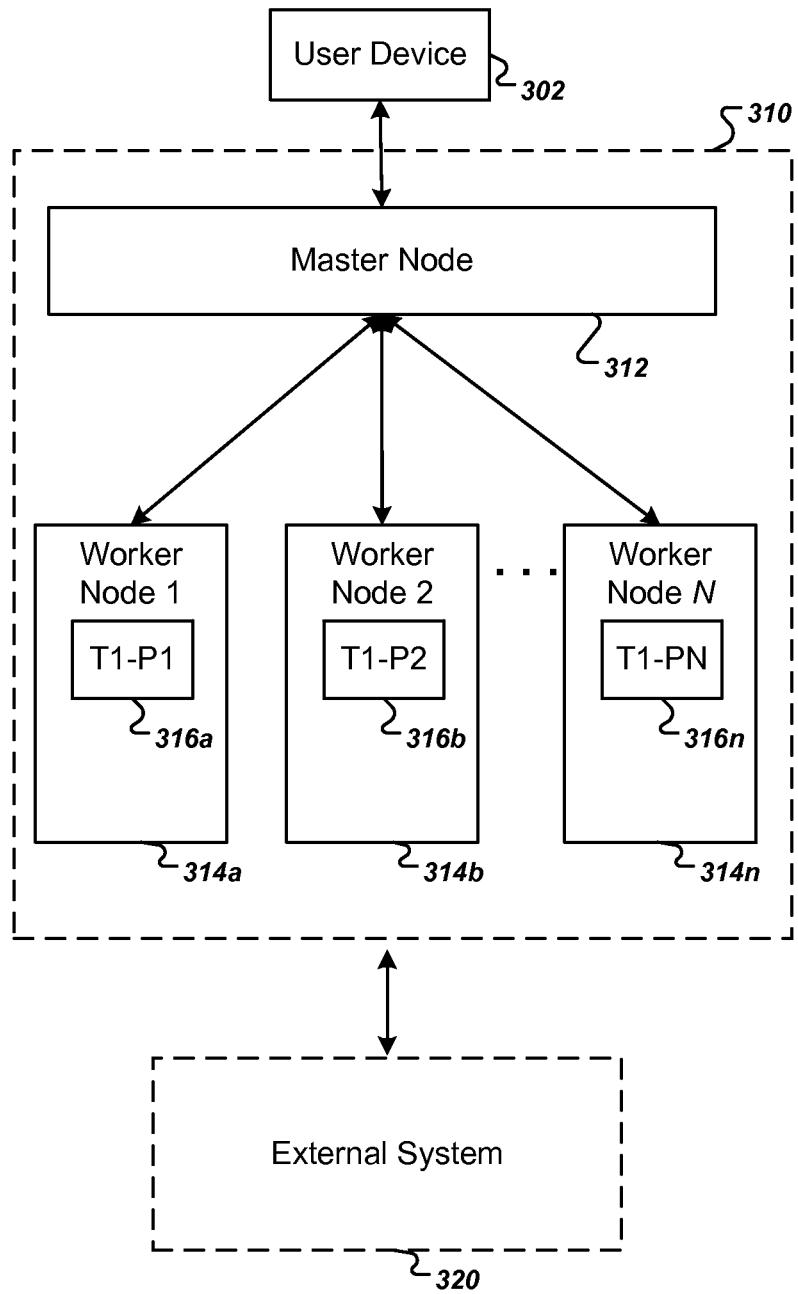
FIG. 3 is a diagram of an example system on which the risk score computations described in this specification can be computed efficiently.

FIG. 3 is a diagram of an example system 310 on which the risk score computations described in this specification can be computed efficiently. The system 310 is an example massively parallel processing (MPP) database management system 310. Other suitable systems include Hadoop, which includes Hadoop Distributed File System (HDFS) and MapReduce programming model.

In the system 310, data is distributed across multiple storage devices. The nodes 314a through 314n, which may be referred to as worker nodes when necessary to distinguish them from the master node, can access the data by communicating with underlying storage systems, which can be, for example, a Hadoop Distributed File System. The data can be replicated, i.e., identical copies of the data can be stored on multiple storage devices, or partitioned, i.e., different portions of the data can be stored on multiple storage devices. For example, the data portions can be table partitions of a massively parallel processing database.

The system 310 includes a master node 312 and multiple worker nodes 314a, 314b, through 314n. The master node 312 and each worker node 314a-n is implemented a physical computer host or a virtual machine on a physical computer host. The master node 312 assigns each worker node to operate on a portion of data stored in the first system 310.

For example, as illustrated, the system 310 includes a first worker node 314a assigned to operate on a first partition 316a of a first database table. Similarly, a second worker node 314b is assigned to operate on a second partition 316b of the first database table. The system 310 can include an arbitrary number N of worker nodes, up to the worker node 314n that is assigned to operate on an Nth partition of 316n of the first database table. A worker node may be assigned to operate on a partition of more than one database table. The partitions a worker node is assigned to operate on will be stored locally to the worker node, e.g., on the worker node, e.g., in random access memory, or on local non-volatile memory, e.g., on disk or flash memory, or otherwise.

Multiple user devices can access the system 310. A user of a user device 302 can access data stored in the system 310 by communicating with the master node 312. The master node 312 coordinates with the worker nodes 314a-314n to respond to requests for data from the user device 302. The user device 302 can issue a query, e.g., a structured query language (SQL) or an object query language (OQL), to the master node 312. The master node 312 communicates with the worker nodes 314a-314n to obtain data that satisfies the query. The master node 312 can maintain a system catalog that provides a mapping between data portions and worker nodes that are assigned to operate on the data portions. Optionally, the system 310 can access data stored on other external systems 320.

The data of W, U, and V is static.

The partitions of W are distributed, preferably randomly, across worker nodes by both src and dst columns.

The partitions of U and x (both $x_T$ and $x_0$) are distributed across worker nodes by using src as the distribution key.

The partitions of V and y (both $y_T$ and $y_0$) are distributed across worker nodes by using dst as the distribution key.

As a result, the calculation of the sum over N(i) in equation (5), above, for each value of j will require only values from one worker node and therefore be computed efficiently. Similarly efficient is the calculation of the sum over N(j) in equation (4), above. Because of the efficient distribution of the data, the calculations can be performed with minimal movement of data from one worker node to another.

Using such a distributed arrangement of data on a massively parallel processing (MPP) database server, in one experiment $x_T$(src) and $y_T$(dst) were computed iteratively as described above for a bipartite graph of about 1.5 million edges derived from over 10 billion network log entries to convergence in 50 iterations in about 20 seconds. The results of the computation predicted highly malicious malware traffic sites that were not previously known, findings that were later validated by forensic experts.

Figure 4:
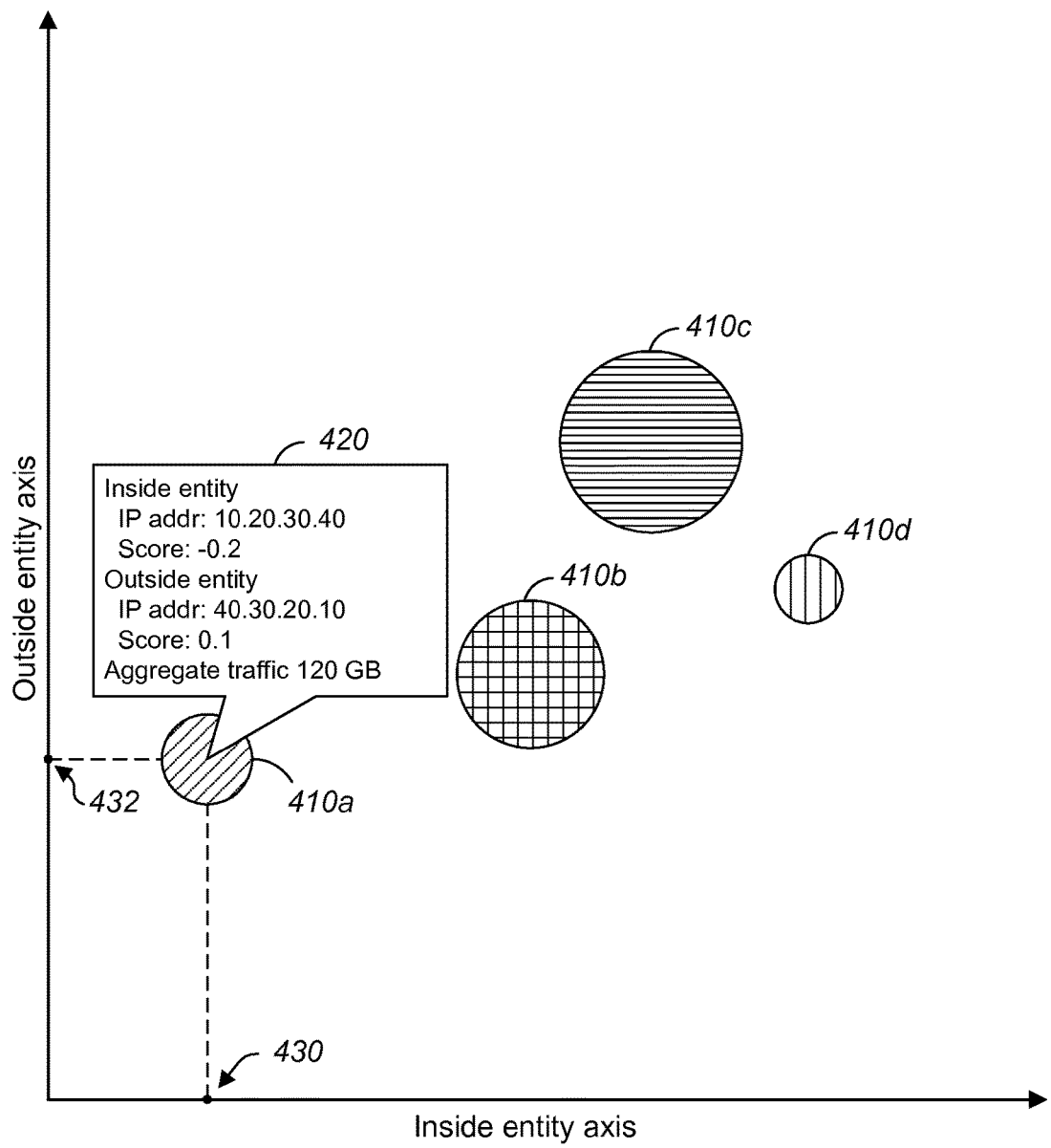
FIG. 4 illustrates a graphical display output of results generated by the methods described in this specification.

FIG. 4 illustrates a graphical display output of results generated by the methods described in this specification. The illustration shows a scatter plot, more particularly, a bubble chart, with an inside entity axis of source scores and an outside entity access with destination scores. Each plotted point, in the present example, each bubble, represents the existence of traffic between a source and a destination. A measure of the traffic is indicated by the size of the bubble. In some implementations, a second measure can be indicated by a color of the bubble. The measures of traffic can be, for example, the aggregated amount of traffic between the source-destination pair, or the number of connections made between the source-destination pair.

In some implementations, the plot display has interactive features; for example, the plot can be defined by an HTML (Hypertext Markup Language) document that defines a tooltip for each plotted point so that a rollover of a cursor over a bubble, for example, causes the display of a popup image or window that displays information about the source, the destination, and the data represented by the bubble.

In addition, a system performing the calculations described above can allow a user to filter results, for example, by specifying the entities for which data is presented, both in plots and in text reports. For example, a user can limit the results shown to data relating to entities having scores in a particular range, to entities in particular geographic locations, to entities of particular kinds, e.g., personal computers or web servers, or to entities belonging to particular administrative units of an enterprise.

FIG. 4 shows a number of bubbles 410a-410d. One of the bubbles 410a is shown with a popup image that displays information about the source, i.e., the inside entity, and the destination, i.e., the outside entity. This display also shows perpendicular lines dropped to the axes to show the source entity score 430 and the destination entity score 432 for the pair of entities represented by the bubble 410a. Note that because the scores can have values less than zero, the origin of the illustrated chart is not at the zero score values. In addition, the axes can be nonlinear, to emphasize certain ranges of scores, for example.

Other kinds of charts can also be used. For example, a three-dimensional chart can be used in which the scores are on two axes and the value of the measure of the traffic data is represented on the third axis, e.g., in a 3D column chart.

Although the foregoing description has specifically applied the methods of semi-supervised iterative learning from partial label data over a bipartite graph to label data characterizing network nodes as malicious or not, these methods are not limited graphs representing network communications traffic or labels representing the known presence or absence of malicious software. Another example is in social network analysis where a user-to-item network is constructed where items can represent registered addresses. The risk score of the users can be ranked in accordance to the partial items' or users' labels, such as whether the user is a known fraudster and/or the address had been known to have fraud activities.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD(liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
   receiving data representing aggregate network traffic data as a bipartite graph between nodes representing first entities and nodes representing second entities, wherein
      each edge of the bipartite graph connects a node representing a respective first entity with a node representing a respective second entity,
      each edge of the bipartite graph has an edge weight representing a measure of the aggregate network traffic between the entities represented by nodes of the graph connected by the edge,
      the aggregate network traffic data represents network traffic between the first entities and the second entities, and
      each of the entities is an entity communicating with one or more other entities on a data communication network;
   receiving an initial collection of ground truth label values for some of the first entities, some of the second entities, or both, wherein each ground truth label value for an entity indicates that the entity is known to be safe or unsafe, and wherein each ground truth label value is either −r or +r, wherein r is a positive real number;
   computing a respective initial score for each of the first entities and each of the second entities, each initial score being a non-zero value for a respective entity that has a known ground truth label value indicating that the entity is known to be safe or unsafe or a zero value for entities that do not have a known ground truth label value, each entity with a ground truth value of −r being assigned an initial score of −r/B, and each entity with a ground truth value of +r being assigned an initial score of +r/A, wherein B is a count of how many values of −r were present in the initial collection, and wherein A is a count of how many values of +r were present in the initial collection;
   iteratively computing a respective final score for each of the first entities and the second entities from the initial scores and the edge weights, the final score indicating malware infection risk of a corresponding entity;
   identifying, based on the final scores, one or more first entities, one or more second entities, or both, that are likely infected with malware; and
   reporting the identified one or more first entities or one or more second entities to a user.

2. The system of claim 1, wherein iteratively computing a respective final score for each entity comprises:
   for each entity, computing at each iteration a new score for the entity from previously-determined scores for other entities having a connection to the entity in the bipartite graph.

3. The system of claim 1, wherein iteratively computing a respective final score for each entity comprises:
   for each entity, computing at each iteration a new score for the entity as a propagation score for the entity from previously-determined scores for other entities having a connection to the entity in the bipartite graph plus the initial score for the entity.

4. The system of claim 3, the operations further comprising:
for each entity, computing the propagation score as a weighted sum of the previously-determined scores, each weight in the weighted sum being a corresponding edge weight from the bipartite graph.

5. The system of claim 1, the operations further comprising:
obtaining network traffic data from transaction logs; and
aggregating the network traffic data to generate the aggregate network traffic data.

6. The system of claim 1, wherein:
the first entities are entities within a perimeter of perimeter entities of the data communication network; and
the second entities are entities outside the perimeter of perimeter entities of the data communication network.

7. The system of claim 1, wherein reporting the identified one or more first entities or one or more second entities comprises:
displaying multiple final scores in a sorted order, including displaying each of the multiple final score with an identifier of the first entity or the second entity of the final score.

8. The system of claim 7, the operations further comprising:
displaying each of the multiple final scores with an indication of whether the first entity or the second entity of the final score had a known ground truth label value.

9. The system of claim 1, wherein iteratively computing a respective final score for each entity comprises:
iteratively computing new score values $x_{t+1}$ and $y_{t+1}$ according to:

$$x_{t+1}(i) = \text{alpha} \times \left( \sum_{j \in N(i)} \left( \frac{W(i, j)}{\sum_{k \in N(j)} W(k, j)} \times y_t(j) \right) \right) + x_0(i)$$

and $$y_{t+1}(j) = \text{beta} \times \left( \sum_{i \in N(j)} \left( \frac{W(i, j)}{\sum_{k \in N(i)} W(i, k)} \times x_t(i) \right) \right) + y_0(j);$$

wherein:
$x_{t+1}(i)$ represents a score for a first entity i at a t+1$^{th}$ iterative step;
$y_{t+1}(j)$ represents a score for a second entity j at a t+1$^{th}$ iterative step;
alpha and beta are propagation constants;
N(p) represents a set of all nodes in the bipartite graph that share an edge with a vertex p;
W(s,t) represents an aggregate weight of the edge in the bipartite graph between nodes s and t;
$x_0(i)$ represents an initial score for the first entity i; and
$y_0(j)$ represents an initial score for the second entity j.

10. The system of claim 9, wherein:
alpha and beta have different values, the higher value indicating a greater degree of trust in the initial scores of the respective first entities and the second entities.

11. The system of claim 9, the operations further comprising:
precomputing $$U(i, j) = \frac{W(i, j)}{\sum_{k \in N(i)} W(i, k)}$$

and $$V(j, i) = \frac{W(i, j)}{\sum_{k \in N(j)} W(k, j)};$$

distributing U(i,j) and V(j,i) on multiple worker nodes, wherein the multiple worker nodes are partitioned by i values for U(i,j) and by j values for V(j,i); and
iteratively computing new score values $x_{t+1}$ and $y_{t+1}$ according to:

$$x_{t+1}(i) = \text{alpha} \times (\Sigma_{j \in N(i)} V(j,i) \times y_t(j)) + x_0(i) \text{ and}$$

$$y_{t+1}(j) = \text{beta} \times (\Sigma_{i \in N(j)} U(i,j) \times x_t(i)) + y_0(j).$$

12. The system of claim 11, the operations further comprising:
distributing U(i,j) and $x_t(i)$ values identically partitioned by the i value to multiple worker nodes;
distributing V(j,i) and $y_t(j)$ values identically partitioned by the j value to multiple worker nodes;
calculating $(\Sigma_{j \in N(i)} V(j,i) \times y_t(j))$ in parallel on the worker nodes having the required U(i,j) and $x_t(i)$ values; and
calculating $(\Sigma_{i \in N(j)} U(i,j) \times x_t(i))$ in parallel on the worker nodes having the required V(j,i) and $y_t(j)$ values.

13. The system of claim 9, the operations further comprising:
precomputing $$U(i) = \frac{1}{\sum_{k \in N(i)} W(i, k)}$$

and $$V(j) = \frac{1}{\sum_{k \in N(j)} W(k, j)};$$

distributing U(i) and V(j) on multiple worker nodes, wherein the multiple worker nodes are partitioned by i values for U(i) and by j values for V(j); and
iteratively computing new score values $x_{t+1}$ and $y_{t+1}$ according to:

$$x_{t+1}(i) = \text{alpha} \times (\Sigma_{j \in N(i)} V(j) \times W(i,j) \times y_t(j)) + x_0(i) \text{ and}$$

$$y_{t+1}(j) = \text{beta} \times (\Sigma_{i \in N(j)} U(i) \times W(i,j) \times x_t(i)) + y_0(j).$$

14. The system of claim 13, the operations further comprising:
distributing U(i) and $x_t(i)$ values identically partitioned by the i value to multiple worker nodes;
distributing V(j) and $y_t(j)$ values identically partitioned by the j value to multiple worker nodes;

calculating ($\Sigma_{j \in N(i)} V(j) \times y_t(j)$) in parallel on the worker nodes having the required U(i) and $x_t(i)$ values; and calculating ($\Sigma_{i \in N(j)} U(i) \times x_t(i)$) in parallel on the worker nodes having the required V(j) and $y_t(j)$ values.

15. The system of claim 1, wherein iteratively computing a respective final score for each entity comprises:

precomputing U(i)=1/|N(i)| and V(j)=1/|N(j)|;

distributing U(i) and V(j) values on multiple worker nodes, wherein the multiple worker nodes are partitioned by i values for U(i) and by j values for V(j);

iteratively computing new score values $x_{t+1}$ and $y_{t+1}$ according to:

$$x_{t+1}(i) = \text{alpha} \times (\Sigma_{j \in N(i)} V(j) \times y_t(j)) + x_0(i) \text{ and}$$

$$y_{t+1}(j) = \text{beta} \times (\Sigma_{i \in N(j)} U(i) \times x_t(i)) + y_0(j);$$

wherein:

$x_t(i)$ represents a score for a first entity i at a $t+1^{th}$ iterative step;

$y_t(i)$ represents a score for a second entity j at a $t+1^{th}$ iterative step;

alpha and beta are propagation constants;

N(p) represents a set of all nodes in the bipartite graph that share an edge with vertex p;

W(s,t) represents an aggregate weight of the edge in the bipartite graph between nodes s and t;

$x_0(i)$ represents an initial score for the first entity i; and $y_0(j)$ represents an initial score for the second entity j.

16. The system of claim 15, wherein:

alpha and beta have different values, the higher value indicating a greater degree of trust in the initial scores of the respective first entities and the second entities.

17. A computer-implemented method performed using one or more hardware processors, the method comprising:

receiving data representing aggregate network traffic data as a bipartite graph between nodes representing first entities and nodes representing second entities, wherein each edge of the bipartite graph connects a node representing a respective first entity with a node representing a respective second entity, each edge of the bipartite graph has an edge weight representing a measure of the aggregate network traffic between the entities represented by nodes of the graph connected by the edge, the aggregate network traffic data represents network traffic between the first entities and the second entities, and each of the entities is an entity communicating with one or more other entities on a data communication network;

receiving an initial collection of ground truth label values for some of the first entities, some of the second entities, or both, wherein each ground truth label value for an entity indicates that the entity is known to be safe or unsafe, and wherein each ground truth label value is either −r or +r, wherein r is a positive real number;

computing a respective initial score for each of the first entities and each of the second entities, each initial score being a non-zero value for a respective entity that has a known ground truth label value indicating that the entity is known to be safe or unsafe or a zero value for entities that do not have a known ground truth label value, each entity with a ground truth value of −r being assigned an initial score of −r/B, and each entity with a ground truth value of +r being assigned an initial score of +r/A, wherein B is a count of how many values of −r were present in the initial collection, and wherein A is a count of how many values of +r were present in the initial collection;

iteratively computing a respective final score for each of the first entities and the second entities from the initial scores and the edge weights, the final score indicating malware infection risk of a corresponding entity;

identifying, based on the final scores, one or more first entities or second entities that are likely infected with malware; and reporting, using the one or more hardware processors, the identified one or more first entities or second entities to a user.

18. The method of claim 17, wherein iteratively computing a respective final score for each entity comprises:

for each entity, computing at each iteration a new score for the entity from previously-determined scores for other entities having a connection to the entity in the bipartite graph.

19. The method of claim 17, wherein iteratively computing a respective final score for each entity comprises:

for each entity, computing at each iteration a new score for the entity as a propagation score for the entity from previously-determined scores for other entities having a connection to the entity in the bipartite graph plus the initial score for the entity.

20. The method of claim 19, comprising:

for each entity, computing the propagation score as a weighted sum of the previously-determined scores, each weight in the weighted sum being a corresponding edge weight from the bipartite graph.

21. The method of claim 17, wherein:

the first entities are entities within a perimeter of perimeter entities of the data communication network; and the second entities are entities outside the perimeter of perimeter entities of the data communication network.

22. The method of claim 21, comprising:

displaying each of the final scores with an indication of whether the first entity or the second entity of the final score had a known ground truth label value.

23. One or more non-transitory computer-readable storage media encoded with instructions that, when executed by one or more computers, cause the one or more computers to perform operations comprising:

receiving data representing aggregate network traffic data as a bipartite graph between nodes representing first entities and nodes representing second entities, wherein each edge of the bipartite graph connects a node representing a respective first entity with a node representing a respective second entity, each edge of the bipartite graph has an edge weight representing a measure of the aggregate network traffic between the entities represented by nodes of the graph connected by the edge, the aggregate network traffic data represents network traffic between the first entities and the second entities, and each of the entities is an entity communicating with one or more other entities on a data communication network;

receiving an initial collection of ground truth label values for some of the first entities, some of the second entities, or both, wherein each ground truth label value for an entity indicates that the entity is known to be safe or unsafe, and wherein each ground truth label value is either −r or +r, wherein r is a positive real number;

computing a respective initial score for each of the first entities and each of the second entities, each initial score being a non-zero value for a respective entity that has a known ground truth label value indicating that the entity is known to be safe or unsafe or a zero value for entities that do not have a known ground truth label value, each entity with a ground truth value of −r being assigned an initial score of −r/B, and each entity with a ground truth value of +r being assigned an initial score of +r/A, wherein B is a count of how many values of −r were present in the initial collection, and wherein A is a count of how many values of +r were present in the initial collection;

iteratively computing a respective final score for each of the first entities and the second entities from the initial scores and the edge weights, the final score indicating malware infection risk of a corresponding entity;

identifying, based on the final scores, one or more first entities or second entities that are likely infected with malware; and reporting the identified one or more first entities or second entities to a user.

24. The one or more storage media of claim 23, wherein iteratively computing a respective final score for each entity comprises:

for each entity, computing at each iteration a new score for the entity from previously-determined scores for other entities having a connection to the entity in the bipartite graph.

25. The one or more storage media of claim 23, wherein iteratively computing a respective final score for each entity comprises:

for each entity, computing at each iteration a new score for the entity as a propagation score for the entity from previously-determined scores for other entities having a connection to the entity in the bipartite graph plus the initial score for the entity.

26. The one or more storage media of claim 25, the operations further comprising:

for each entity, computing the propagation score as a weighted sum of the previously-determined scores, each weight in the weighted sum being a corresponding edge weight from the bipartite graph.

27. The one or more storage media of claim 23, wherein:

the first entities are entities within a perimeter of perimeter entities of the data communication network; and the second entities are entities outside the perimeter of perimeter entities of the data communication network.

28. The one or more storage media of claim 27, the operations further comprising:

displaying each of the final scores with an indication of whether the first entity or the second entity of the final score had a known ground truth label value.

* * * * *